United States Patent [19]

Wolf et al.

[11] Patent Number: 4,682,012
[45] Date of Patent: Jul. 21, 1987

[54] APPARATUS FOR CONTROLLING AND ADJUSTING HEAT OUTPUT DURING THE HEATING PHASE OF A COOKING VESSEL

[75] Inventors: Kurt Wolf; Wolfram K. Andre, both of Wildbad, Fed. Rep. of Germany

[73] Assignee: Kurt Wolf & Co. KG, Fed. Rep. of Germany

[21] Appl. No.: 829,840

[22] Filed: Feb. 14, 1986

[30] Foreign Application Priority Data

Feb. 15, 1985 [DE] Fed. Rep. of Germany ....... 3505233

[51] Int. Cl.$^4$ .............................................. H05B 1/02
[52] U.S. Cl. .................................... 219/490; 219/492; 219/508; 99/330; 99/332; 426/523
[58] Field of Search ............... 219/490, 491, 494, 497, 219/492, 507, 508, 506; 99/328, 329, 331, 325, 332, 333, 327; 426/520, 523

[56] References Cited

U.S. PATENT DOCUMENTS 3,859,644  1/1975  Main ..................................... 219/499
4,443,690  4/1984  Payne et al. ......................... 219/506

FOREIGN PATENT DOCUMENTS 2932039  2/1981  Fed. Rep. of Germany .
2949890  6/1981  Fed. Rep. of Germany .
3026620  2/1982  Fed. Rep. of Germany .

Primary Examiner—M. H. Paschall
Attorney, Agent, or Firm—Thomas W. Speckman; Ann W. Speckman

[57] ABSTRACT

An apparatus for controlling and adjusting heat output during the heating phase of a cooking vessel. The cooking vessel is heated by an electric heating element and the temperature inside the cooking vessel is measured. The heating element is provided with a control circuit and two program memories which operate as a function of the temperature increase characteristics during the simmer or warming cycles, whereby in the simmer cycle, both the first and second program memories are operative whereas in the warming cycle only the second program memory is operative in a similar manner as during the simmer cycle and over the same temperature differential but at different temperature values.

16 Claims, 5 Drawing Figures

| ΔTx [°C] | s1 [%] | s [sec] to |
|---|---|---|
| <1,5 | 100 | 24 |
| 2,0 | 87,5 | 21 |
| 2,5 | 75,5 | 18 |
| 3,0 | 62,5 | 15 |
| 3,5 | 50,0 | 12 |
| 4,0 | 37,5 | 9 |
| 4,5 | 25,0 | 6 |
| 5,0 | 12,5 | 3 |
| >5,0 | 0 | 0 | to = 24 sec

FIG.4 s2 [%] ⟶ Tg−Ti [°C] OR Tw−Ti [°C]

| ΔTy [°C] | 15 | 12 | 9 | 6 | 4,5 | 3 | 2,5 | 2 | 1,5 | 1 | 0,5 | 0 | − |
|---|---|---|---|---|---|---|---|---|---|---|---|---|---|
| <1,5 | 100 | 100 | 50 | 25 | 19 | 19 | 19 | 12,5 | 12,5 | 12,5 | 6 | 0 | 0 |
| 2,0 | 100 | 50 | 25 | 19 | 19 | 12,5 | 12,5 | 6 | 0 | 0 | | | |
| 2,5 | 50 | 25 | 19 | 12,5 | 6 | 0 | 0 | 0 | | | | | |
| 3,0 | 25 | 19 | 6 | 0 | 0 | | | | | | | | |
| 3,5 | 19 | 12,5 | 0 | | | | | | | | | | |
| 4,0 | 12,5 | 6 | | | | | | | | | | | |
| 4,5 | 6 | 0 | | | | | | | | | | | |
| 5,0 | 0 | | | | | | | | | | | | |
| >5,0 | 0 | | | | | | | | | | | | |

FIG.5

APPARATUS FOR CONTROLLING AND ADJUSTING HEAT OUTPUT DURING THE HEATING PHASE OF A COOKING VESSEL

BACKGROUND OF THE INVENTION

1. Field of the Invention

The present invention relates to an apparatus for controlling and adjusting heat output during the heating phase of a cooking vessel having simmering and warming cycles, whereby the temperature in and/or at the cooking vessel is monitored and is employed by a control circuit to switch an electric heating element off and on, as required to adjust the temperature inside the vessel to achieve preset simmering or warming temperatures.

2. Description of the Prior Art

An apparatus of this type is disclosed in German Patent Publication DE-OS No. 29 32 039. In this known apparatus, a time function element is automatically adjusted as a function of the temperature or of the pressure in the cooking vessel in order to affect the cooking or boiling process according to the conditions in the cooking vessel. The purpose of this arrangement is to insure that the duration of the cooking or boiling process is suitably modified under fluctuating conditions in the cooking vessel. An arrangement of this type will only be useful if such fluctuating conditions occur during the cooking or boiling process, which might result from unsatisfactory adjustment or control of the cooking or boiling temperature.

In another known apparatus according to German Patent Publication DE-OS No. 30 26 620, the heat output of the heating element is controlled by a microprocessor which is provided with signals from a signal transmitter attached to the cooking vessel. The advantage of this arrangement resides in the fact that it allows a number of parameters affecting the cooking or boiling process to be manually preset at the same time. However, this apparatus does not provide any means of automatically adjusting control of the cooking or boiling temperature, taking into account different heating characteristics.

SUMMARY OF THE INVENTION

A purpose of the present invention is to provide an apparatus of the above type in which a preset temperature is reached and kept at a constant level in the most rapid and accurate way for a number of different temperature levels which can be preset for simmering (or for waterless cooking or boiling at any temperature below the temperature at which the water will evaporate) and for keeping the contents warm by means of a simple control arrangement, whereby the type and quantity of the food product to be processed in the cooking vessel is taken into account.

This objective is achieved with the apparatus according to the present invention, whereby in a simmer cycle the control circuit activates and maintains the heat output of the heating element at its highest level and as soon as a first trigger temperature is exceeded, the temperature increase is monitored during preset time intervals until a second, higher trigger temperature is reached. The control circuit adjusts the heat output of the heating element during the following time interval to its full heat output or to a definite adjusted heat output according to a first preset program for a heat output time which depends upon the temperature increase measured during the time interval preceding the moment at which the second trigger temperature is reached; this heat output time decreases as the monitored temperature increase is greater. When the cooking material is merely being maintained at a constant warming temperature, the heating element is maintained at full heat output until a third trigger temperature is reached. The same predetermined temperature differential pertains between the second trigger temperature and the preset cooking temperature during the simmer cycle on the one hand, and between the third trigger temperature and the preset warming temperature in the warming cycle on the other hand. A preset minimum temperature increase is monitored during predetermined time intervals as soon as the second trigger temperature is reached in the simmer cycle, or as soon as the third trigger temperature is reached in the warming cycle. Should the minimum temperature increase not be reached, the heating element will be switched to its full heat output or to a defined heat output, whereas if the minimum temperature increase is achieved, the heating element will be adjusted by the control circuitry according to a second preset program to its full heat output or to a definite adjusted heat output during the subsequent time interval, the heat output time decreasing as the further temperature increase is greater and the temperature differential between the selected simmering or warming temperature and the actual temperature in the cooking vessel is less.

Whether the food product is being simmered or warmed, the same control program is employed over the same temperature differential at different levels, which allows a correspondingly simple control system to be used. This is made possible by simply assuming a different reference temperature during differentiation from the actual temperature. While the cooking material is being warmed, the heating element operates at full heat output until the controlled temperature range is reached, whereas during simmering an additional temperature control range is used in which the heat output is adjusted according to a different program. This program utilizes the temperature increase during predetermined time intervals until the second trigger temperature is reached, since this measurement is indicative of the type and quantity of the cooking material. Thus, in the simmer cycle, depending on the type and quantity of cooking material to be processed, which is expressed in the temperature/time characteristic curve of the heating phase, the cooking material will be brought up to the final temperature range gradually in order to avoid overshooting the desired temperature, which would otherwise be particularly inconvenient due to the amount of steam which would be produced (such as would occur, for example, if milk is allowed to boil over).

In a preferred embodiment of the present invention, the third trigger temperature which is in the warming cycle is lower than the first trigger temperature which is in the simmer cycle and the warming temperature in the warming cycle is about the same as the first trigger temperature which is in the simmer cycle.

In a further embodiment of the present invention, the control system can be simplified by providing the control circuitry of the heating element with a semiconductor switch for switching the heating element on and off, which can be controlled in the conventional way by means of a zero crossing switch with period group control functions, whereby the duration of the period corresponds to a preset time interval. The time intervals for measurement of the temperature increase can then be derived from the timing means in the period group control system.

In another embodiment of the present invention, the first program is involved in the heat output control in the simmer cycle by the provision of a first switch circuit which derives the temperature increase at preset intervals from the actual temperature/time characteristics, whereby in the simmer cycle a first measurement circuit monitors the actual temperature value for the point at which the first trigger temperature is reached. When the first trigger temperature is reached, the first measurement circuit transmits the temperature increase measurements monitored during preset time intervals by the first nwitch circuit to a first program memory via a second switch circuit, whereby during the following time interval the program memory switches the heating element to its full heat output or to a definite adjusted heat output as a function of the temperature increase signal transmitted to it for the time period defined by the first program.

A second program of heat output control in the simmer as well as the warming cycle is provided in a second embodiment of the present invention by a second measurement circuit which monitors the actual measured temperature as soon as a second trigger temperature is reached in the simmer cycle and the actual measured temperature as soon as a third trigger temperature is reached in the warming cycle, whereby as soon as the second or third trigger temperatures are reached, the first measurement circuit is disabled by the second measurement circuit and a third switch circuit is activated for measuring the further temperature increase during preset time intervals, whereby the measured further temperature increase is compared with a preset minimum temperature increase by means of a comparison circuit. If the preset minimum temperature increase is not reached, the heating element is switched by the control circuit to its full heat output or to a preset defined heat output during the following time interval by means of the comparison circuit, whereas if the minimum temperature increase is reached, the temperature increase subsequently measured is transmitted to a second program memory. A third measurement circuit transmits the temperature differential between the preset simmering or warming temperature and the actual measured temperature value to the second program memory. In the subsequent time interval, the heating element is switched by the control circuit to its full heat output or to an adjusted heat output for a time period defined by the second program, as a function of the further temperature increase and the measured temperature differential.

In another embodiment of the present invention, the heating element is switched to constant full heat output until the first trigger temperature is reached which is in the simmer cycle or until the third trigger temperature is reached which is in the warming cycle by the provision of a base measurement circuit which monitors the measured temperature for the points at which the first trigger temperature and the third trigger temperature are reached. The heating element is maintained at its full heat output or at a defined heat output by the base measurement circuit through the control circuit until the first or third trigger temperature is reached.

In another embodiment of the present invention the number of electronic components employed is kept to a minimum by the incorporation of the switch circuits, measurement circuits, the base measurement circuit, the comparison circuit, the control circuit and the program memories in a microprocessor.

BRIEF DESCRIPTION OF THE DRAWINGS

The present invention will now be explained in greater detail with the help of the embodiments illustrated in the drawings, wherein:

FIG. 4 illustrates a first program which operates only in the simmer cycle; and

FIG. 5 illustrates a second program which is operative in both the simmer and warming cycles.

DESCRIPTION OF PREFERRED EMBODIMENTS

Figure 1:
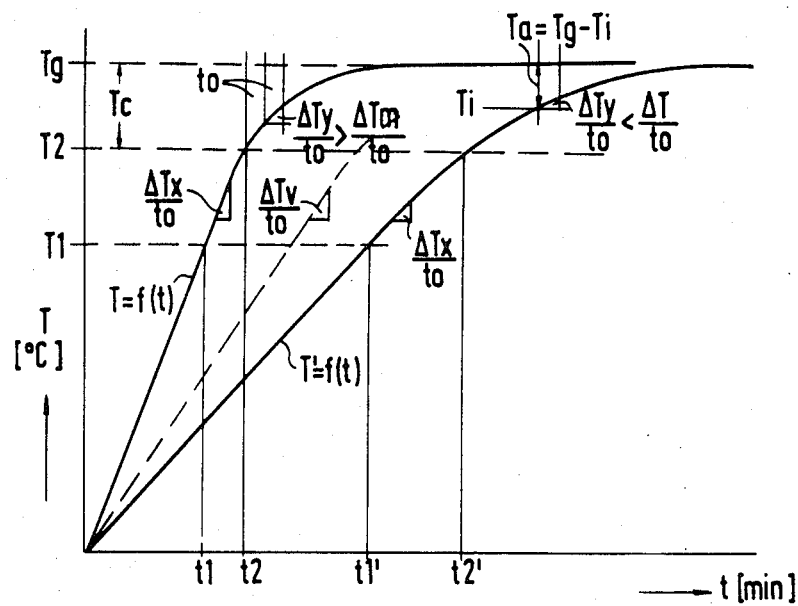
FIG. 1 illustrates time/temperature characteristic for the simmer cycle.

FIG. 1 shows temperature/time characteristics $T=f(t)$ and $T'=f(t)$ which may occur in the simmering cycle. In this case, the temperature increase $\Delta Tx$ in preset time interval to during the heating phase will depend upon the type and quantity of cooking material being processed in the cooking vessel. Here, time point t1 or t1' at which first trigger temperature T1 is reached will vary. Until trigger temperature T1 which may be 70° C. for example, is reached, the heating element is run at full heat output. As soon as first trigger temperature T1 is reached, temperature increases $\Delta Tx$ in preset time intervals to are monitored in the simmer cycle. By means of a first preset program, as shown in FIG. 4, the heat output in the subsequent time interval to is adjusted as a function of the measured temperature increase $\Delta Tx$. In this instance, a heat output time s1 is determined as a percentage of time interval to. If temperature increase $\Delta Tx$ is less than 1.5 degrees, the heating element will remain continuously switched to its full heat output or to a defined heat output for the whole of the subsequent time interval to.

Figure 2:
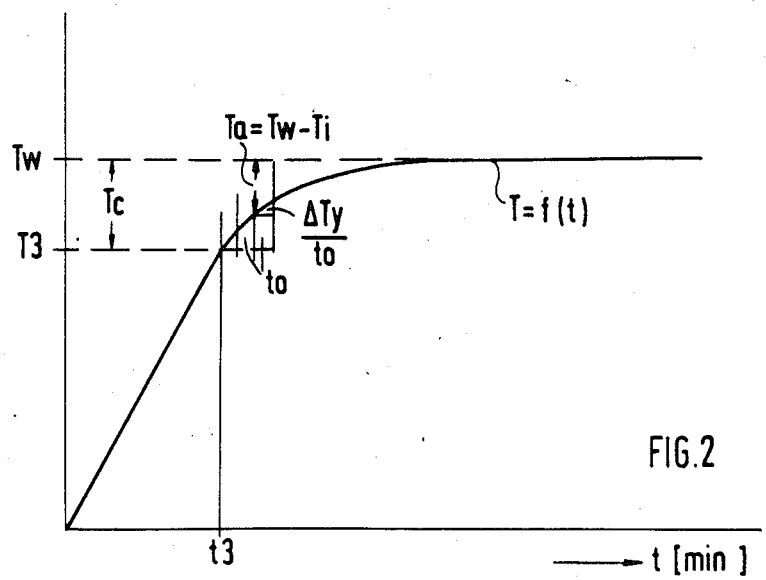
FIG. 2 illustrates a time/temperature characteristic for the warming cycle.

If the measured temperature increase $\Delta Tx$ is greater than 5 degrees, the heating element will remain switched off during the entire subsequent time interval to. This extreme value corresponds to a mean temperature/time characteristic at a preset temperature increase $\Delta Tv$ in time interval to shown by the dashed line in FIG. 1. This insures that if there is a large temperature increase $\Delta Tx$ in time interval to, the heat output will be reduced according to the program shown in FIG. 4, until second trigger temperature T2 of 80° C., for example, is reached. Second trigger temperature T2 is preset at a temperature differential Tc from preset cooking temperature Tg of 95° C., for example. This temperature differential Tc of, for example, 15° C. in this instance also pertains between warming temperature Tw and third trigger temperature T3 in the warming cycle, as shown in FIG. 2. In this case, warming temperature Tw may correspond to first trigger temperature T1 of 70° C. This provides a third trigger temperature T3 of 55° C.

In the simmer cycle, second trigger temperature T2 will be reached at various time points t2 or t2'. Notwithstanding, as soon as second trigger temperature T2 is reached, the further temperature increases $\Delta Ty$ in time intervals to are measured. The further temperature increase ΔTy in time interval to is compared with a preset minimum temperature increase ΔTm. If the minimum temperature increase ΔTm is not achieved in time interval to, the heating element will remain continuously switched to its full heat output or to a defined heat output throughout the subsequent time interval to. If the measured further temperature increase ΔTy exceeds the preset minimum temperature increase ΔTm, the heat output will be reduced according to a second program shown in FIG. 5. In this instance, both the measured further temperature increase ΔTy as well as the temperature differential Ta between the preset cooking temperature Tg and the actual measured temperature Ti will be taken into account. If temperature differential Ta is large and the measured further temperature increase ΔTy is small, the heating element will remain continuously switched to its full heat output or to a defined heat output for a time interval s2 as shown in FIG. 5 throughout subsequent time interval to. If temperature differential Ta is small and the measured further temperature increase ΔTy is large, time interval s2 will be practically zero or only a small fraction of time interval to. At an average temperature differential Ta of b 6° C., for example, and a measured further temperature increase ΔTy of 2.5° C., the time interval s2 will be 12.5 percent of time interval to, or in other words, with a time interval to of 24 seconds, during the subsequent time interval the heating element will be activated for only 3 seconds.

In the warming cycle, as shown in FIG. 2, the system will run at full heat output until third trigger temperature T3 is reached. If third trigger temperature T3 is reached after the time point t3, heating output will also be reduced according to the second program shown in FIG. 5. At the same time, the further temperature increase ΔTy will be measured and temperature differential Ta between the preset warming temperature Tw and the actual measured temperature Ti in the cooking vessel is calculated. Temperature differential Tc between third trigger temperature T3 and warming temperature Tw corresponds to temperature differential Tc between second trigger temperature T2 and cooking temperature Tg in the simmer cycle.

Figure 3:
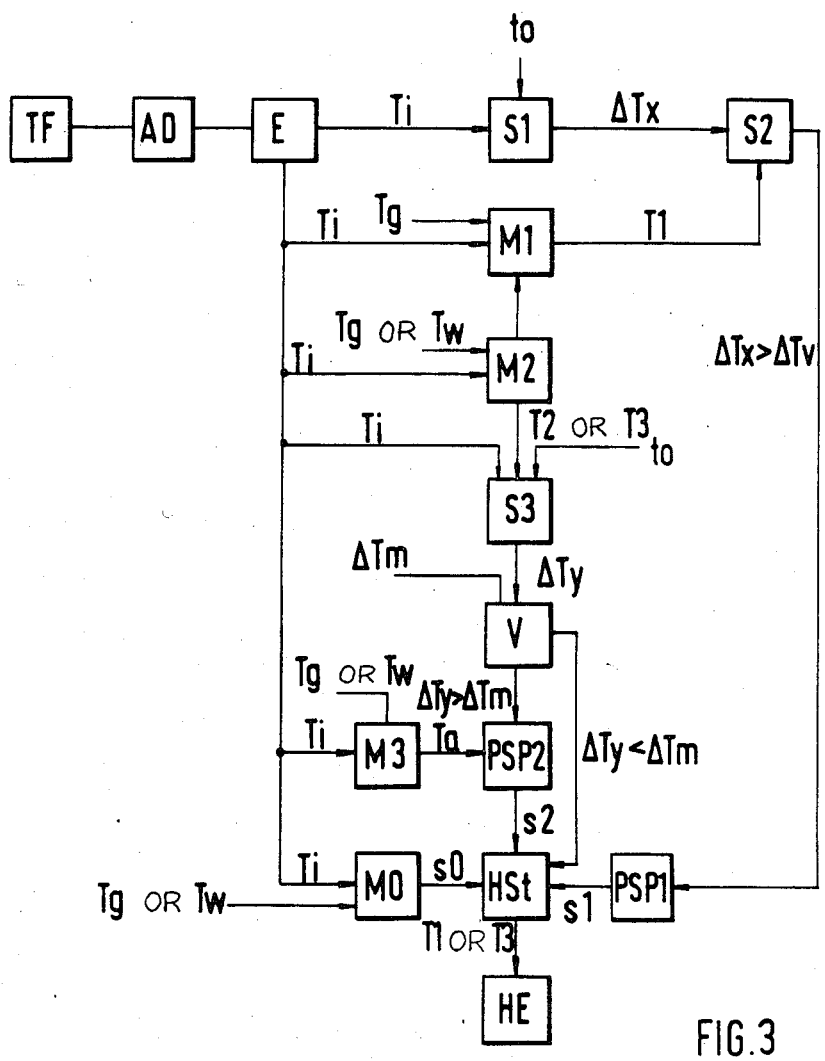
FIG. 3 is a block circuit diagram of the apparatus.

On the basis of the block circuit diagram shown in FIG. 3, switching on and off of a cooking vessel in the simmer and warming cycles is explained in greater detail.

Temperature sensor TF measures the temperature Ti in or at the location of the cooking vessel. This measurement is converted to a digital signal in analog/digital converter AD and is then transmitted to receiver E over transmission link Ue. According the preset simmer or warming mode, the actual temperature Ti is monitored by base measurement circuit MO, as it increases to first or third trigger temperature T1 or T3, as indicated by input Tg or Tw to base measurement circuit MO. In this way, at control circuit HSt the switching signal maintains heating element HE switched at full heat output until first or third trigger temperature T1 or T3 is reached.

In the simmer cycle, first measurement circuit M1 determines when first trigger temperature T1 is reached and then controls second switch circuit S2 to which the measured temperature increase ΔTx during time interval to is supplied by first switch circuit S1. The measured temperature increase ΔTx is transmitted to first program memory PSP1 which in turn supplies a signal to control circuit HSt according to the program shown in FIG. 4, which determines the length of heat output time interval s1.

In the simmer cycle, second measurement circuit M2 monitors the time taken to reach second trigger temperature T2 as well as the time taken to reach third trigger temperature T3 and then provides a signal to third switch circuit S3 which differentiates the further temperature increase ΔTy in time interval to and signals this to comparison circuit V. The minimum preset temperature increase ΔTm is also supplied to comparison circuit V. If the measured further temperature increase ΔTy is smaller than the minimum temperature increase ΔTm, comparison circuit V controls heating element HE by means of control circuit Hst so that it is switched to full heat output or to a defined heat output. If measured temperature increase ΔTy is the same as or greater than the minimum temperature increase ΔTm, comparison circuit V transmits the measured further temperature increase ΔTy to second program memory PSP2 in which the program according to FIG. 5 is stored. Depending on whether the simmer or warming cycle is specified, measurement circuit M3 measures actual temperature differential Ta and transmits this to second program memory PSP2. In this way temperature differential Ta is derived from either Tg-Ti or from Tw-Ti. Second program memory PSP2 contains the information necessary to derive heat output time interval s2 and determines the percentage of the following time interval in which the heating element will remain switched on.

Control circuit HSt is preferably a period group control circuit with a period whose duration corresponds to time interval to. Time interval to can thus be simply derived from the timing means of the period group control circuit.

We claim:

1. An apparatus having a control circuit means for controlling and adjusting heat output of a heating element during the heating phase of a cooking vessel operable in at least a first and a second mode of operation prior to reaching a first and a second preset cooking temperature, respectively, said apparatus comprising:
    switch means for selectively activating said heating element according to one of said first and second modes of operation;
    temperature sensor means (TF) for continuously measuring an actual temperature (Ti) at said cooking vessel;
    base measurement circuit means (MO) in communication with said temperature sensor means (TF) and said control circuit means (HSt) for monitoring said actual temperature measurements (Ti) and signalling said control circuit means when a first trigger temperature (T1) in said first mode of operation or a third trigger temperature (T3) in said second mode of operation has been reached;
    first switch circuit means (S1) in communication with said temperature sensor means (TF) for measuring a first temperature increase (ΔTx) during consecutive preset time intervals (to);
    second switch circuit means (S2) in communication with said first switch circuit means (S1) for receiving said first temperature increase measurements (ΔTx) and conveying said first temperature increase measurements (ΔTx) to a first program memory means (PSP1) after said first trigger temperature (T1) has been reached and before a second trigger temperature (T2) greater than said first trigger temperature (T1) and less than said first preset cooking temperature (Tg) has been reached in said first mode of operation;

third switch circuit means (S3) in communication with said temperature sensor (TF) for measuring a second temperature increase (ΔTy) during consecutive said preset time intervals (to) after said second trigger temperature (T2) and said third trigger temperature (T3) in said first and second modes of operation, respectively, have been reached and until said first preset cooking temperature (Tg) and said second preset cooking temperature (Tw) have been reached, respectively;

comparison circuit means (V) in communication with said third switch circuit means (S3) for receiving said second temperature increase measurements (ΔTy) and comparing each said second temperature increase (ΔTy) to a preset minimum temperature increase (ΔTm); signalling said control circuit (HSt) when said second temperature increase (ΔTy) is less than said preset minimum temperature increase (ΔTm); and signalling a second program memory means (PSP2) when said second temperature increase (ΔTy) is equal to and greater than said preset minimum temperature increase (ΔTm);

measurement circuit means (M3) in communication with said temperature sensor means (TF) for measuring a temperature differential (Ta) between said measured actual temperature (Ti) and said first and second preset cooking temperatures (Tg, Tw) in said first and second modes of operation, respectively, when said second temperature increase (ΔTy) is equal to and greater than said preset minimum temperature increase (ΔTm) during the preceding said preset time interval (to); and said control circuit means (HSt) in communication with said base measurement circuit (MO), said first and second program memory means (PSP1, PSP2), and said heating element for maintaining said heating element at a first preset output until said first trigger temperature (T1) and said third trigger temperature (T3) are reached in said first and second modes of operation, respectively; regulating said heating element according to said first and second program memory means (PSP1, PSP2); and maintaining said heating element at a second preset output when said second temperature increase (ΔTy) is equal to and greater than said preset minimum temperature increase (ΔTm).

2. An apparatus according to claim 1, wherein said third trigger temperature (T3) for said second mode of operation is lower than said first trigger temperature (T1) for said first mode of operation.

3. An apparatus according to claim 2, wherein said second preset cooking temperature (Tw) corresponds approximately to said first trigger temperature (T1) for said first mode of operation.

4. An apparatus according to claim 3, wherein said control circuit (HSt) for said heating element (HE) comprises a semiconductor switch for activating and deactivating said heating element; a zero crossing switch; and a period group control circuit, whereby the duration of each period corresponds to said preset time intervals (to).

5. An apparatus according to claim 1, wherein said switch circuits, said measurement circuits, said base measurement circuit (MO), said comparison circuit (V), said control circuit (HSt) and said first and second program memories (PSP1, PSP2) are incorporated in a microprocessor.

6. A process for controlling and adjusting heat output of a heating element during the heating phase of a cooking vessel operable in at least a first and a second mode of operation prior to reaching a first and a second preset cooking temperature, (Tg, Tw) respectively, said process comprising:

selectively activating said heating element according to one of said first and said second modes of operation;

continuously measuring an actual temperature (Ti) at said cooking vessel;

maintaining said heating element at a first heat output until a first trigger temperature (T1) less than said first preset cooking temperature (Tg) is reached when operated in said first mode of operation and maintaining said heating element at said first heat output until a third trigger temperature (T3) less than said second preset cooking temperature (Tw) is reached when operated in said second mode of operation;

measuring a first temperature increase (ΔTx) during consecutive preset time intervals (to) after said first trigger temperature (T1) has been reached in said first mode of operation and regulating said heating element for each subsequent present time interval (to) according to a first preset program and based upon the preceding said first temperature increase (ΔTx) until a second trigger temperature (T2) greater than said first trigger temperature (T1) and less than said first preset cooking temperature (Tg) is reached;

measuring a second temperature increase (ΔTy) during each consecutive said preset time interval (to) after said second trigger temperature (T2) has been reached in said first mode of operation and after said third trigger temperature (T3) has been reached in said second mode of operation, and comparing each said second temperature increase (ΔTy) to a preset minimum temperature increase (ΔTm) established for said preset time intervals (to);

maintaining said heating element at a second heat output during each said preset time interval (to) when said second temperature increase (ΔTy) is less than said preset minimum temperature increase (ΔTm) during the preceding said preset time interval (to);

measuring a temperature differential (Ta) between said measured actual temperature (Ti) and said first and second preset cooking temperatures (Tg, Tw) in said first and second modes of operation, respectively, when said second temperature increase (ΔTy) is equal to and greater than said preset minimum temperature increase (ΔTm) during the preceding said preset time interval (to);

regulating said heating element according to a second preset program and based upon said second temperature increase (ΔTy) and said temperature differential (Ta) measured during the preceding said preset time interval (to) when said second temperature increase (ΔTy) is equal to and greater than said preset minimum temperature increase (ΔTm) during the preceding said preset time interval (to) until said first and second preset cooking temperatures (Tg, Tw) in said first and second modes of operation, respectively, are attained.

7. A process according to claim 6 wherein said first mode of operation comprises a simmering cycle and said second mode of operation comprises a warming cycle.

8. A process according to claim 6 wherein said heating element is regulated according to said first preset program to provide that heat output in subsequent said preset time intervals (to) is inversely proportional to said first temperature increase ($\Delta Tx$) measured during the preceding said preset time interval (to).

9. A process according to claim 6 wherein said heating element is regulated according to said second preset program to provide that heat output in subsequent said preset time intervals (to) is inversely proportional to said second temperature increase ($\Delta Ty$) and proportional to said temperature differential (Ta) measured during the preceding said preset time interval (to).

10. A process according to claim 6 wherein said first heat output and said second heat output are both full heat outputs of said heating element.

11. A process according to claim 6 wherein a difference between said second trigger temperature (T2) and said first preset cooking temperature (Tg) in said first mode of operation is substantially the same as a difference between said third trigger temperature (T3) and said second preset cooking temperature (Tw) in said second mode of operation.

12. A process according to claim 11 wherein said third trigger temperature (T3) in said second mode of operation is lower than said first trigger temperature (T1) in said first mode of operation.

13. A process according to claim 12 wherein said second preset cooking temperature (Tw) corresponds approximately to said first trigger temperature (T1) in said first mode of operation.

14. A process according to claim 13 wherein said first trigger temperature (T1) is about 70° C., said second trigger temperature (T2) is about 80° C., said third trigger temperature (T3) is about 55° C., said first preset cooking temperature (Tg) is about 95° C., and said second preset cooking temperature (Tw) is about 70° C.

15. A process according to claim 6 additionally comprising comparing said first temperature increase ($\Delta Tx$) to said preset minimum temperature increase ($\Delta Tm$) and maintaining said heating element at a third heat output during each said preset time interval (to) when said first temperature increase ($\Delta Tx$) is less than said preset minimum temperature increase during the preceding said preset time interval (to).

16. A process according to claim 15 additionally comprising inactivating said heating element during each said preset time interval (to) when said first temperature increase ($\Delta Tx$) measured during a preceding said preset time interval (to) exceeds a preset maximum temperature increase established for said preset time intervals (to).

* * * * *